United States Patent

Naitou et al.

[11] Patent Number: 5,522,603
[45] Date of Patent: Jun. 4, 1996

[54] PACKING RINGS, METHOD FOR PRODUCTION OF THE PACKING RINGS, AND SEAL DEVICE USING THE PACKING RINGS

[75] Inventors: Kazumasa Naitou; Shosuke Naito, both of Kitakoma-gun; Takahisa Ueda; Masaru Fujiwara, both of Sanda, all of Japan

[73] Assignees: Kitz Corporation, Chiba-Ken; Nippon Pillar Packing Co., Ltd., Osaka-Fu, both of Japan

[21] Appl. No.: 253,354

[22] Filed: Jun. 3, 1994

[30] Foreign Application Priority Data

Jan. 31, 1994 [JP] Japan .................................. 6-025937

[51] Int. Cl.⁶ ...................................................... F16J 15/22
[52] U.S. Cl. .......................... 277/102; 277/123; 277/204; 277/227
[58] Field of Search .................................... 277/102, 123, 277/124, 203, 204, 227, 233

[56] References Cited

U.S. PATENT DOCUMENTS

| | | | |
|---|---|---|---|
| 1,086,240 | 2/1914 | Strong | 277/227 |
| 1,155,018 | 9/1915 | Towne | 277/233 |
| 4,068,853 | 1/1978 | Schnitzler | 277/102 |
| 4,157,835 | 6/1979 | Kahle et al. | 277/204 |
| 4,162,078 | 7/1979 | Cox | 277/102 |
| 4,190,257 | 2/1980 | Schnitzler | 277/102 |
| 4,256,317 | 3/1981 | Havens et al. | 277/112 |
| 4,328,974 | 5/1982 | White et al. | 277/122 |
| 4,350,346 | 9/1982 | Fowler | 277/26 |
| 4,364,542 | 12/1982 | Meyer | 251/214 |
| 4,394,023 | 7/1983 | Hinojosa | 277/124 |
| 4,455,334 | 6/1984 | Ogino et al. | 428/36 |
| 4,457,491 | 7/1984 | Dudman | 251/317 |
| 4,667,969 | 5/1987 | Suggs, III | 277/230 |
| 4,705,722 | 11/1987 | Ueda et al. | 428/365 |
| 4,826,181 | 5/1989 | Howard | 277/112 |
| 4,892,320 | 1/1990 | Tückmantel | 277/125 |
| 4,934,657 | 6/1990 | Dodson | 251/214 |
| 4,961,988 | 10/1990 | Zhu | 428/229 |
| 5,050,298 | 9/1991 | Dodson | 29/888.3 |
| 5,134,030 | 7/1992 | Ueda et al. | 428/365 |
| 5,135,240 | 8/1992 | Dodson | 277/188 A |
| 5,188,376 | 2/1993 | Ueda et al. | 277/227 |

FOREIGN PATENT DOCUMENTS 1-29315  9/1989  Japan .

*Primary Examiner*—William A. Cuchlinski, Jr.
*Assistant Examiner*—John L. Beres
*Attorney, Agent, or Firm*—Wenderoth, Lind & Ponack

[57] ABSTRACT

A packing ring of a composite structure including a packing of expanded graphite and an annular mass of superposed sheets of expanded graphite is produced by a method including the steps of spirally winding a ribbon of expanded graphite into a roll, compression molding the roll into the packing, and incorporating the annular mass into the packing by compression molding within a molding die so as to give rise to at least one packed part having a higher density than the packing in at least one of the inner and outer peripheral parts of the packing, the seal device has an empty space through which a shaft passes and containing at least one such packing in the empty space to seal between the inner wall of the empty space and the outer peripheral surface of the shaft.

19 Claims, 8 Drawing Sheets

PACKING RINGS, METHOD FOR PRODUCTION OF THE PACKING RINGS, AND SEAL DEVICE USING THE PACKING RINGS

BACKGROUND OF THE INVENTION

1. Field of the Invention

This invention relates to packing rings, a method for the production of the packing rings, and a sealing device using the packing rings.

2. Description of the Prior Art

Packing rings can be used extensively as seal members in parts prone mainly to rotary or reciprocating sliding motions or as seal members in stationary parts. For example, they can be used in a seal device to be interposed between the body or bonnet and the stem of a valve or in a seal device for fluid-handling devices and to be incorporated in a pump shaft sealing part etc. Examples of the fluids for which the packing rings are effectively used include gases, liquids and loose solid materials,. Particularly in recent years, the free emission of fluids from the fluid-handling devices has been posing a serious problem from the standpoint of preservation of the earth's environment. From this point of view, there is a great demand for devloping packing rings which excel in heat resistance and chemical resistance as well as in fast sealing property.

The packing rings are generally known in two types. Those of one type are produced by cutting a ribbon from a sheet of expanded graphite, winding the ribbon into a spiral roll and compression molding the roll annularly in a die, and those of the other type are produced by laminating a plurality of sheets of expanded graphite and punching a ring of prescribed dimensions out of the resultant lamination.

The packing rings of the two types are inserted in an empty space adapted for accommodation thereof and then compressed therein prior to use.

In the case of the packing rings of the former type, since they easily deform laterally, namely in the radial direction, under the force of the compression, they gain in force of contact with a stuffing box or a shaft and consequently manifest a sufficient sealing function even when the stuffing box or the shaft lacks the accuracy of machining of the surface or the dimensional accuracy. However, such satisfactory sealing function tends to decline with the elapse of time because the packing rings easily protrude through gaps such as occurring between the bottom surface of the stuffing box and the shaft, between the gland retainer and the shaft and between the gland retainer and the empty space of the stuffing box, and consequently entails a loss in the force of the compression.

Further, since the fastness of adhesion between the layers of the laminated sheet material forming the packing rings is rather degraded than exalted by the force of the compression exerted on the packing rings, the fluid being handled is liable to permeate the packing rings in the axial direction. Besides, since the surfaces of the packing rings which contact other packing rings, the bottom surface of the stuffing box, or the retaining surface of the gland retainer is formed of the end face of the sheet material which forms the packing rings. The packing rings betray poor fastness of adhesion on the surfaces in question and tend to get wet, and the surfaces themselves tend to sustain injury and demand delicate handling.

Then, in the case of the packing rings of the latter type, these packing rings do not gain very much in force of contact with the stuffing box or the shaft because the ratio at which the packing rings are deformed laterally, namely in the radial direction, under the force of the compression is very small. When the stuffing box or the shaft lacks the accuracy of machining of the surface or the dimensional accuracy, therefore, the packing rings tend to entail leakage of the fluid because of the poor fastness of adhesion. Fortunately, these packing rings preclude the permeation of fluid therethrough in the axial direction under the force of compression, manifest satisfactory fastness of adhesion thereof to the bottom surface of the stuffing box or to the retaining surface of the gland retainer, and permit no ready leakage of fluid through the interfaces. Further, these packing rings do not very often protrude through the empty space for accommodating the packing rings, namely through the gap between the bottom part of the stuffing box and the shaft, the gap between the gland retainer and the shaft and the gap between the gland retainer and the stuffing box. The possibility that the packing rings will protrude to the extent of degrading the force of compression and sacrificing the sealing function is remote.

These packing rings are at a disadvantage in entailing easy vertical separation between the layers of laminated sheet material, readily sustaining injury, demanding delicate handling, and calling for much time and labor for the sake of maintenance.

FIG. 18 is a partial longitudinal cross section illustrating a seal device which is disclosed in Japanese Utility Model Publication No. 1-29315. This seal device has been proposed for the purpose of utilizing packing rings of expanded graphite produced by the two methods described above while eliminating the drawbacks thereof and harnessing the advantages thereof.

In FIG. 18, reference numerals 21 to 25 stand for packing rings of expanded graphite, specifically numerals 21 and 25 each stand for a packing ring produced by the latter of the two methods and numerals 22, 23 and 24 each for a packing ring produced by the former method. Reference numeral 26 stands for a stuffing box, numeral 27 for a stem, and numeral 28 for a gland retainer.

As illustrated in FIG. 18, the packing rings 21 to 25 are compressed with the gland retainer 28 inside the stuffing box 26. As a result, the packing rings 22, 23 and 24 produced by the former method are deformed in the radial direct! ion and brought into tight contact with the stuffing box 26 and the stem 27 to preclude the otherwise possible leakage of fluid along the interfaces of the contact.

The packing rings 21 and 25, in the meanwhile, prevent leakage therethrough of the fluid which has permeated through the packing rings 22, 23 and 24 in the axial direction. Further, the packing rings 21 and 25 prevent leakage therethrough of the fluid which has flowed through the interfaces thereof with the packing ring 22 or 24, a bottom surface 26a of the stuffing box 26, and a retaining surface 28a of the gland retainer 28. Since the packing rings 21 and 25 are superposed in a direction which is perpendicular to the gap A between the bottom part of the stuffing box 26 and the stem 27, the B between the gland retainer 28 and the stem 27 and the C between the gland retainer 28 and the stuffing box 26, they are suffered to protrude through these gaps very rarely.

Even in the seal device which is constructed as illustrated in FIG. 8, however, the packing rings 21 through 25 tend to sustain injury and demand delicate handling. Particularly the packing rings 21 and 25 easily separate vertically from the intervening packing rings 22 to 24 and render the work of maintenance thereof difficult. Though they protrude through the aforementioned gaps A, B and C only slightly, the protrusion nevertheless remains to be a problem. Moreover, this seal device is at a disadvantage in insufficiently preventing leakage therethrough of a gas of small molecular weight or a solvent of strong osmosis.

One object of the present invention is to provide packing rings of expanded graphite excelling heal; resistance and chemical resistance and nevertheless eliminating the drawbacks inherent in the conventional packing rings.

Another object of the present invention is to provide a method for the production of the packing rings.

Still another object of the present invention is to provide a seal device using the packing rings.

SUMMARY OF THE INVENTION

To accomplish the objects described above, according to the invention there is provided a packing ring of a composite structure comprising a packing obtained by spirally winding a ribbon of expanded graphite into a roll and compression molding the roll, and an annular mass of superposed sheets of expanded graphite incorporated into the packing by compression molding so as to give rise to at least one packed part having a higher density than the packing in at least one of an inner peripheral part and an outer peripheral part of the packing; a method for the production of a packing ring comprising the steps of spirally winding a ribbon of expanded graphite into a roll, compression molding the roll into a packing, disposing an annular mass of superposed sheets of expanded graphite at a position in the packing, and compression molding a resultant composite within a molding die so as to give rise to at least one packed part having a higher density than the packing in at least one of an inner peripheral part and an outer peripheral part of the packing; and a seal device having an empty space through which a shaft passes and containing at least one packing ring in the empty space in a compressed fashion to seal between an inner wall of the empty space and an outer peripheral surface of the shaft, the at least one packing ring comprising a packing obtained by spirally winding a ribbon of expanded graphite into a roll and compression molding the roll, and an annular mass of superposed sheets of expanded graphite incorporated into the packing by compression molding so as to give rise to at least one packed part having a higher density than the packing in at least one of an inner peripheral part and an outer peripheral part of the packing.

The above and other objects, features and advantages of this invention will become apparent to those skilled in the art from the description of the invention given in detail hereinbelow with reference to the accompanying drawings.

DETAILED DESCRIPTION OF THE PREFERRED EMBODIMENTS

Figure 1:
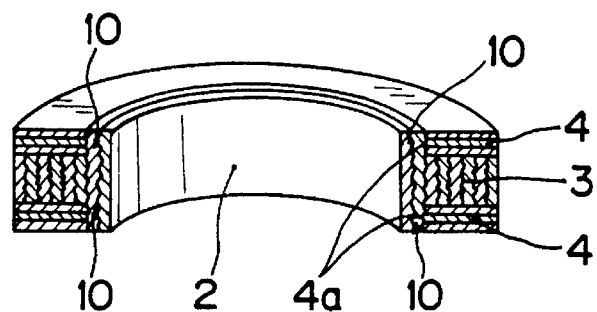
FIG. 1 is a halved perspective view illustrating one example of the packing ring according to this invention.

The present invention will now be described in detail with reference to the illustrated embodiments.

FIGS. 1 to 10 are invariably halved perspective views illustrating examples of the packing ring according to the present invention, and FIGS. 11 to 14 are sectioned explanatory views of the packing rings shown in FIGS. 1 to 4, respectively.

In FIGS. 1 to 14, reference numeral 2 designates a packing ring, Though this packing ring 2 is an endless ring, a cord-like packing adapted to be inserted in the shape of a ring in an empty space for accommodation of a packing ring may be used instead. The packing ring 2 comprises a packing 3 formed by spirally winding a ribbon of expanded graphite into a roll and compression molding the roll, and an annular mass 4 of superposed sheets of expanded graphite. The annular mass 4 has an inside diameter larger than the inside diameter of the packing 3 and/or has an outside diameter smaller than the outside diameter of the packing 3. The packing rings 2 shown in FIGS. 1 to 14 are invariably in a composite structure having one or two annular masses 4 incorporated in the packing 3. In all of the packing rings 2, the packing 3 is extended to either one or both of the inner peripheral part 4a and the outer peripheral part 4b of the annular mass 4. In other words, the packing 3 is driven into at least one of the inner and outer peripheral parts 4a and 4b of the annular mass 4 to give rise to a packed part 10 of a density higher than that of the packing 3. The packed part 10 is formed in a portion of the packing 3 resulting from the difference in diameter between the annular mass 4 and the packing 3.

In all the packing rings 2, the packings 3 formed by spirally winding a ribbon of expanded graphite into a roll and compression molding the roll invariably have a density in the range of 0.7 to 1.9 g/cc, preferably in the range of 1.0 to 1.5 g/cc (1.3 g/cc, for example) and the annular masses 4 of superposed sheets of expanded graphite have a density in the range of 0.7 to 1.9 g/cc, preferably less than that of the packings 3.

These packing rings 2 are invariably produced by spirally winding a ribbon of expanded graphite into a roll, compression molding the roll into a packing 3 having a predetermined inside diameter and a predetermined outside diameter, disposing at least one annular mass 4 of superposed sheets of expanded graphite having a larger inside diameter than the packing 3 and/or having a smaller outside diameter than the packing 3 at a given position or positions in the packing 3, and compression molding the resultant composite within a molding die (not shown) so as to give rise to a packed part 10 of a density higher than that of the packing 3 in a portion of the packing 3 resulting from the difference in diameter between the annular mass 4 and the packing 3.

Figure 5:
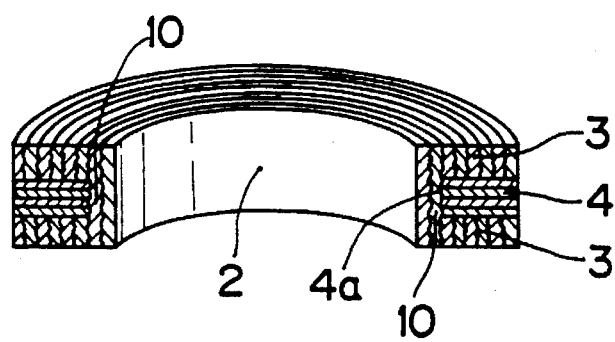
FIG. 5 is a halved perspective view illustrating a further example of the packing ring according to this invention.
Figure 6:
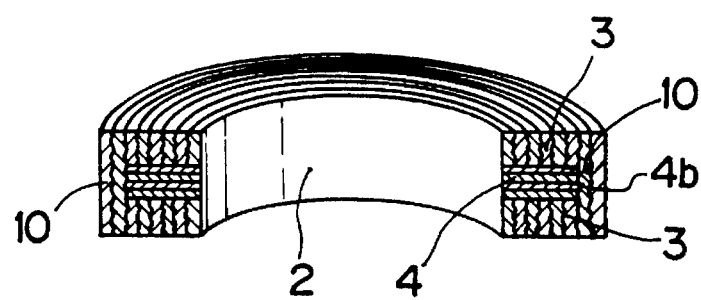
FIG. 6 is a halved perspective view illustrating another example of the packing ring according to this invention.
Figure 7:
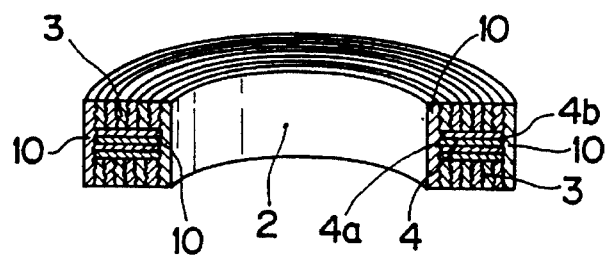
FIG. 7 is a halved perspective view illustrating still another example of the packing ring according to this invention.
Figure 8:
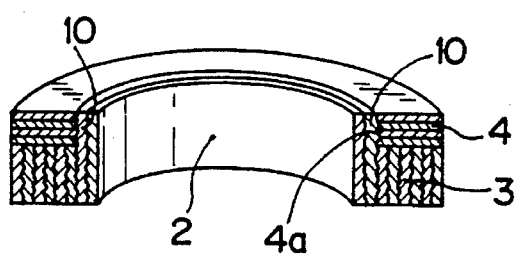
FIG. 8 is a haired perspective view illustrating yet another example of the packing ring according to this invention.
Figure 9:
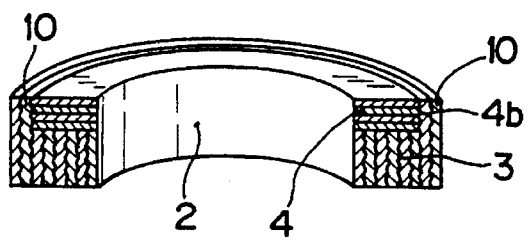
FIG. 9 is a halved perspective view illustrating a further example of the packing ring according to this invention.
Figure 10:
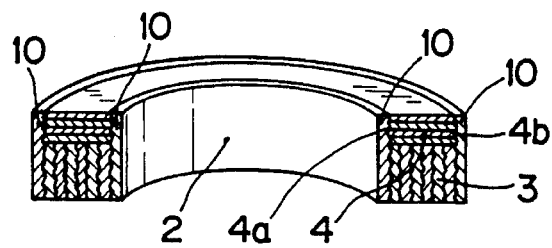
FIG. 10 is a halved perspective view illustrating another example of the packing ring according to this invention.

The packing rings 2 shown in FIGS. 1 to 4 have two annular masses 4 of superposed sheets of expanded graphite incorporated one each in the upper and lower surfaces of a packing 3, the packing rings 2 shown in FIGS. 5 to 7 have such a mass 4 incorporated in the intermediate part of the packing 3 in the direction of its thickness, and the packing rings 2 shown in FIGS. 8 to 10 have such a mass 4 incorporated in either the upper surface or the lower surface of the packing 3.

It is desirable to dispose an annular mass 4 of superposed sheets of expanded graphite on the inner peripheral part, the outer peripheral part, or each of both the inner and outer peripheral parts of a packing 3 formed by spirally winding a ribbon of expanded graphite into a roll and compression molding the roll so as to give rise to a packed part 10 of a higher density in the relevant area.

To be specific, the packing ring shown in FIG. 1 has a construction such that each of the annular masses 4 extends to the outer peripheral part of the packing 3, thereby giving rise to packed parts 10 of a density higher than that of the packing 3 in the relevant areas on the side of the inner peripheral part of the packing 3. The packing ring shown in FIG. 2 has a construction such that each of the annular masses 4 extends to the inner peripheral part, thereby giving rise to packed parts 10 of a density higher than that of the packing 3 in the relevant areas on the side of the outer peripheral part of the packing 3. The packing ring shown in FIG. 3 has a construction such that one of the annular masses 4 extends to the outer peripheral part of the packing 3 and that the other annular mass 4 extends to the inner peripheral part of the packing 3, thereby giving rise to packed parts 10 having a higher density than the packing 3 in the relevant areas, one on the side of the inner peripheral part of the packing 3 and the other on the side of the outer peripheral part of the packing 3. The packing ring shown in FIG. 4 has a construction such that each of the annular masses 4 extends to portions immediately before the inner and outer peripheral parts of the packing 3 so as to give rise to packed parts 10 having a higher density than the packing 3 in the relevant areas on both sides of the inner and outer peripheral parts of the upper and lower surfaces of the packing 3. These configurations of the packing rings shown in FIGS. 1 to 4 will be more understood from FIGS. 11 to 14, respectively.

The packing ring shown in FIG. 5 has a construction such that the mass 4 extends to the outer peripheral part of the packing 3, thereby giving rise to a packed part 10 of a density higher than that of the packing 3 in the relevant area on the side of the inner peripheral part of the packing 4. The packing ring 2 shown in FIG. 6 has a construction such that the mass 4 extends to the inner peripheral part of the packing 3, thereby giving rise to a packed part 10 of a density higher than that of the packing 3 in the relevant area on the side of the outer peripheral part of the packing 3. The packing ring shown in FIG. 7 has a construction such that the mass 4 extends immediately before the inner and outer peripheral parts of the packing 3, thereby giving rise to packed parts 10 of a density higher than that of the packing 3 in the relevant areas on both sides of the inner and outer peripheral parts of the packing 3.

The packing ring shown in FIG. 8 has a construction such that the mass 4 extends to the outer peripheral parts of the packing 3, thereby giving rise to a packed part 10 of a density higher than that of the packing 3 in the relevant area on the side of the inner peripheral part of the packing 3. The packing ring illustrated in FIG. 9 has a construction such that the mass 4 extends to the inner peripheral part of the packing 3, thereby giving rise to a packed part 10 having of a density higher than the packing 3 in the relevant area on the side of the outer peripheral part of the packing 3. The packing ring shown in FIG. 10 has a construction such that the mass 4 extends immediately before the inner and outer peripheral pars of the packing 3, thereby giving rise to packed parts 10 of a density higher than that of the packing 3 in the relevant areas on both sides of the inner and outer peripheral parts of the packing 3.

Any of the measures mentioned above proves advantageous for the sake of this invention.

Figure 15:
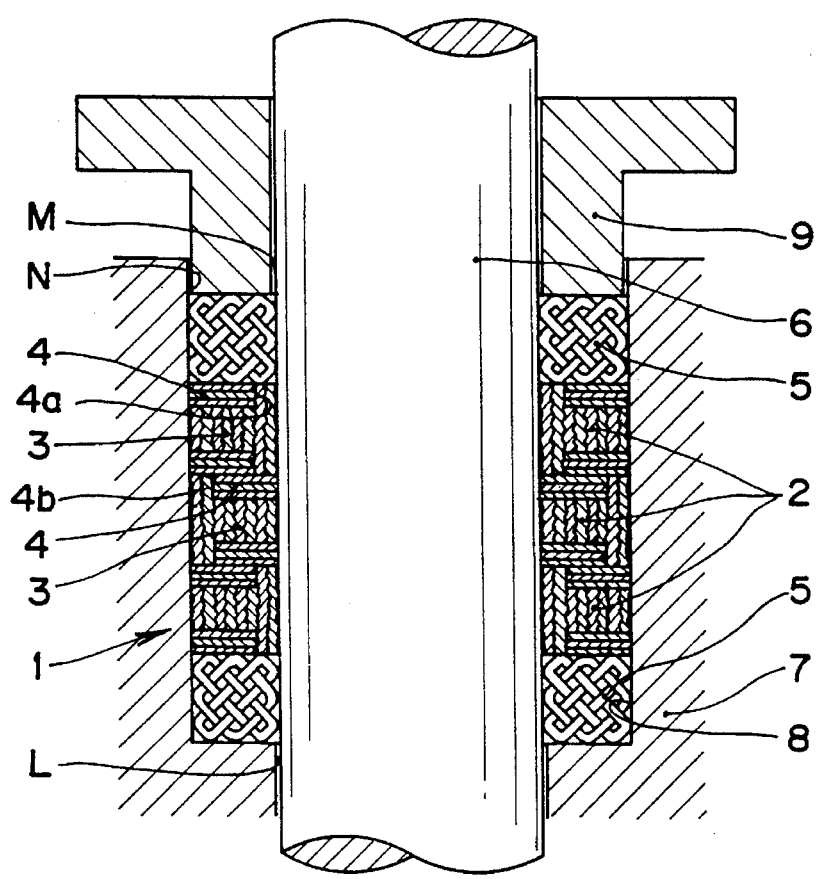
FIG. 15 is a partial cross section illustrating one example of the seal device according to this invention.
Figure 16:
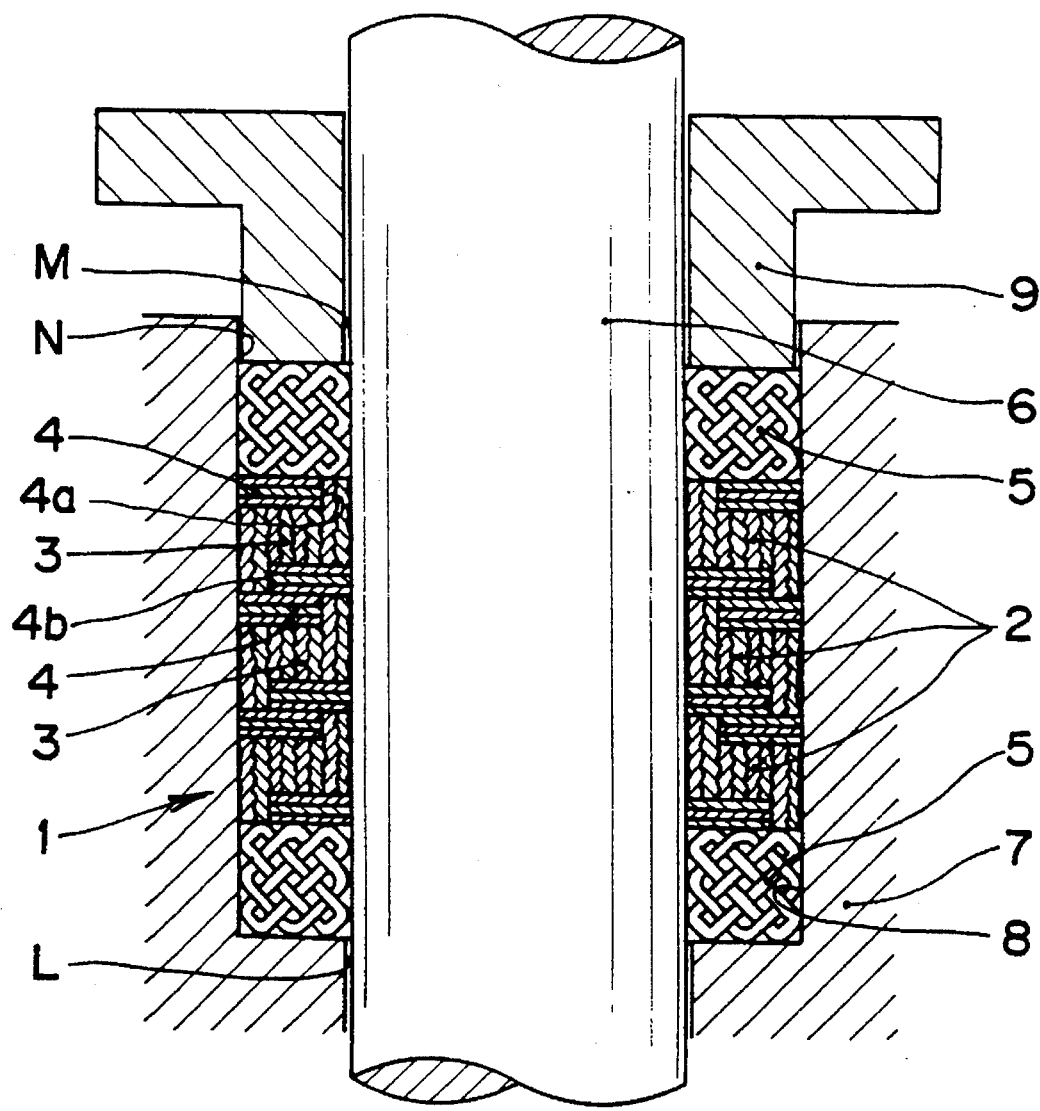
FIG. 16 is a partial cross section illustrating another example of the seal device according to this invention.

FIGS. 15 and 16 are partial cross sections showing examples of the seal device according to this invention. In these Figures, reference numeral 1 designates a seal device.

Figure 2:
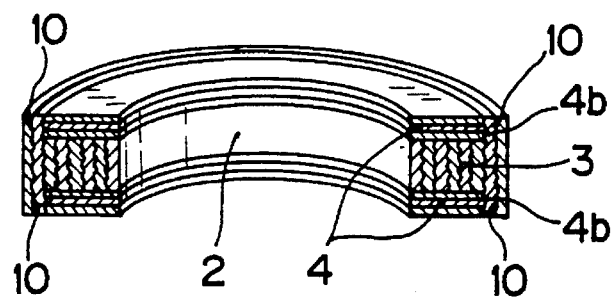
FIG. 2 is a halved perspective view illustrating another example of the packing ring according to this invention.
Figure 11:
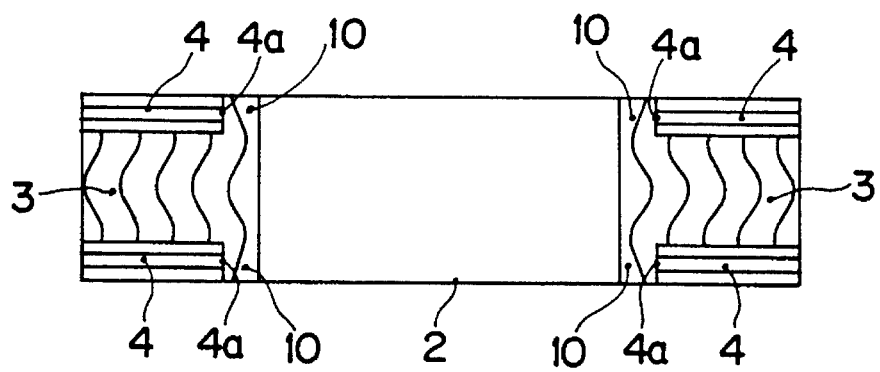
FIG. 11 is a sectioned explanatory view of the packing ring shown in FIG. 1.
Figure 12:
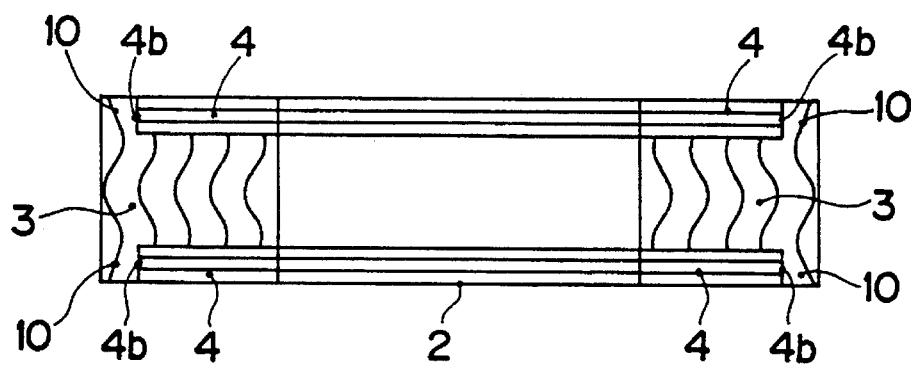
FIG. 12 is a sectioned explanatory view of the packing ring shown in FIG. 2.

In the seal device 1 shown in FIG. 15, a packing ring 2 shown in FIG. 2 or 12 is sandwiched between two packing rings 2 shown in FIGS. 1 or 11, and the three superposed packing rings 2 are sandwiched between two braided packing rings 5 formed by braiding a knitting yarn made of carbon fibers or expanded graphite. The plurality of superposed packing rings 2 and 5 are inserted into a stuffing box 8, i.e. an empty space adapted for accommodation thereof. In the seal device 1 thus constructed, the braided packing rings 5 is enabled to manifest the function of a wiper ring.

Figure 3:
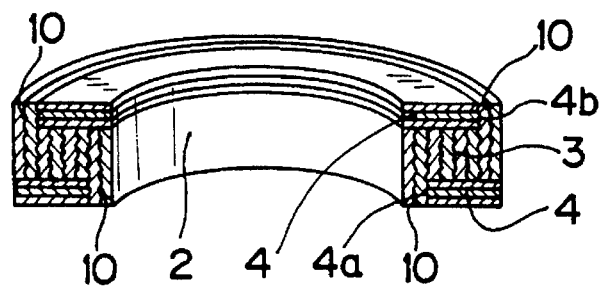
FIG. 3 is a halved perspective view illustrating still another example of the packing ring according to this invention.
Figure 4:
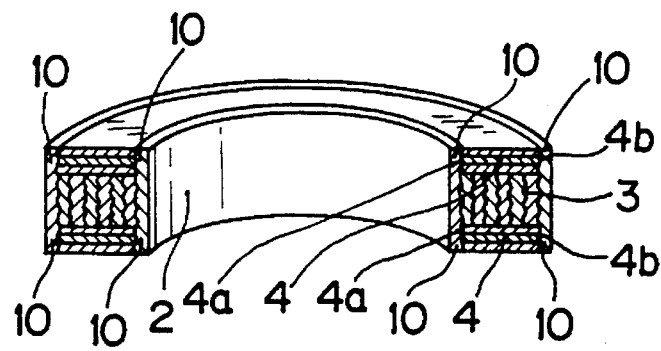
FIG. 4 is a halved perspective view illustrating yet another example of the packing ring according to this invention.
Figure 13:
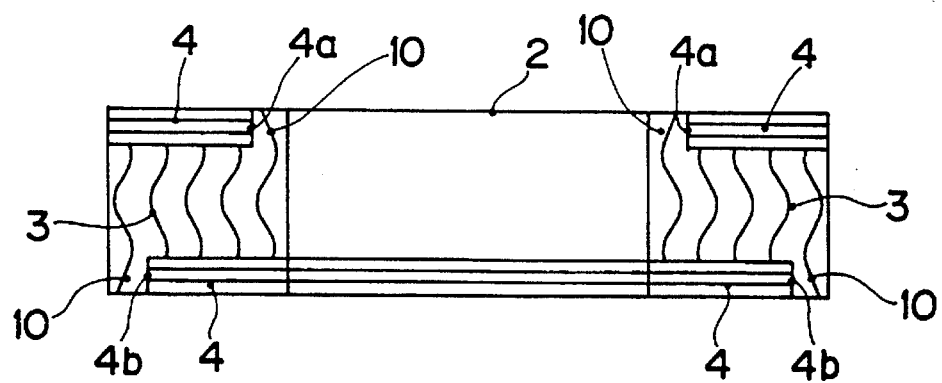
FIG. 13 is a sectioned explanatory view of the packing ring shown in FIG. 3.
Figure 14:
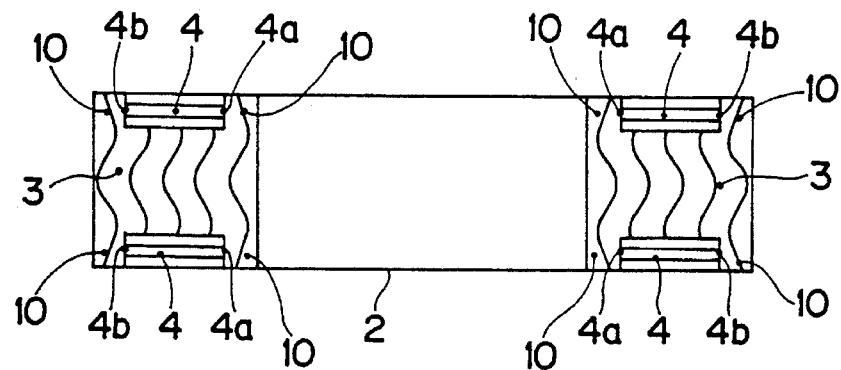
FIG. 14 is a sectioned explanatory view of the packing ring shown in FIG. 4.

In the seal device 1 illustrated in FIG. 16, three packing rings 2 shown in FIG. 3 or 13 are superposed one on top of another and are sandwiched between two braided packing rings 5 formed by braiding a knitting yarn of expanded graphite. The plurality of superposed packing rings 2 and 5 are inserted into a stuffing box 8, i.e. an empty space adapted for accommodation thereof. In this case, the braided packing rings 5 are also enabled to manifest the function of a wiper ring. The seal device 1 thus constructed encounter no trouble pertaining to maintenance because the packing rings 2 of the same composite construction are not erroneously incorporated into the seal device 1 during the assembly of the seal device 1.

The seal device 1 illustrated in FIG. 15 or 16 is desirably used in the shaft grand part of a pump (not shown) or in the seal part of a valve. In FIGS. 15 and 16, reference numeral 6 stands for the stem of the valve, numeral 7 for the body or bonnet of the valve, and numeral 9 for a gland retainer.

Now, the operation of the working example will be described below.

When the packing ring 2 of this invention constructed as illustrated in FIGS. 1 to 14 is set in place inside the stuffing box 8 and then compressed with the gland retainer 9 as shown in FIGS. 15 and 16, the packings 3 formed by spirally winding a ribbon of expanded graphite into a roll and compression molding the roll easily deform in the radial direction and consequently cause the inner and outer peripheral parts thereof to form a tight seal in a gap L between the stem 6 and the bottom part of the stuffing box 8 and prevent the otherwise possible leakage through this gap L and, at the same time, the annular masses 4 of superposed sheets of expanded graphite obstruct the possible fluid leakage in the axial direction through the interfaces between the component layers of the packings 3. Thus, these packing rings 2 serve as quite excellent seal members for precluding free emission of the fluids being handled in fluid-handling devices.

The packing ring 2 in the present example is in a composite construction which is formed by integrally combining packings 3 and masses 4, i.e. two members different in texture. The formed packing ring 2 not only exhibits excellent leakproofness as described above but also permits easy handling and simple maintenance owing to such fastness of the composition of component members such that the upper and the lower surfaces of the packing ring 2 neither sustain injury or separate vertically from each other.

This packing ring 2 acquires the optimum sealing property because the density of the packing 3 is set at about 1.3 g/cc and the density of the annular masses 4 is set at a level lower than that of the packing 3, but equal to or higher than about 0.7 g/cc. The packing ring 2, therefore, neither deforms nor fractures in the process of compression molding and the produced packing ring 2 sustains injury only with difficulty.

Further, the possibility that the packing 3 will protrude through the gap L between the bottom part of the stuffing box 8 and the stem 6, the gap M between the gland retainer 9 and the stem 6 and the gap N between the gland retainer 9 and the stuffing box 8 can be precluded by the annular masses 4 of superposed sheets of expanded graphite. Incidentally, the problem of this protrusion in the examples illustrated in FIGS. 15 and 16 can be solved substantially completely by causing the packing 5 formed by braiding a knitting yarn of expanded graphite to be driven into the upper and lower ends of the stuffing box 8, i.e. an empty space for accommodation of packing rings, which are not completely closed.

In producing either the packings 3 or the annular masses 4, tolerance in height and diameter is produced among the packings 3 or annular masses 4. When an annular mass 4 has been incorporated into a packing 3 by compression molding into a packing ring 2, there are some cases, due to the tolerance, where a packed part 10 of the packing 3 consequently formed has a projection (not shown) slightly extending in the axial direction of the packing ring 2 and where the annular mass 4 has a moderate slope (not shown). When such packing rings 2 are set in place inside the stuffing box 8 and compressed by the gland retainer 9, the projection and slope are tightened to induce stress in the radial direction, thereby obtaining a large sealing effect.

The seal device 1 illustrated in FIG. 15 or 16, comprising a total of three superposed packing rings 2 formed of expanded graphite of a relatively small friction coefficient relative to the stem 6 in the shape illustrated in FIGS. 1 and 2 or in the shape illustrated in FIG. 3 and packing rings 5 formed by braiding a knitting yarn of expanded graphite and adjoined one each to the opposite end parts of the superposed packing rings 2 proves very effective.

Figure 18:
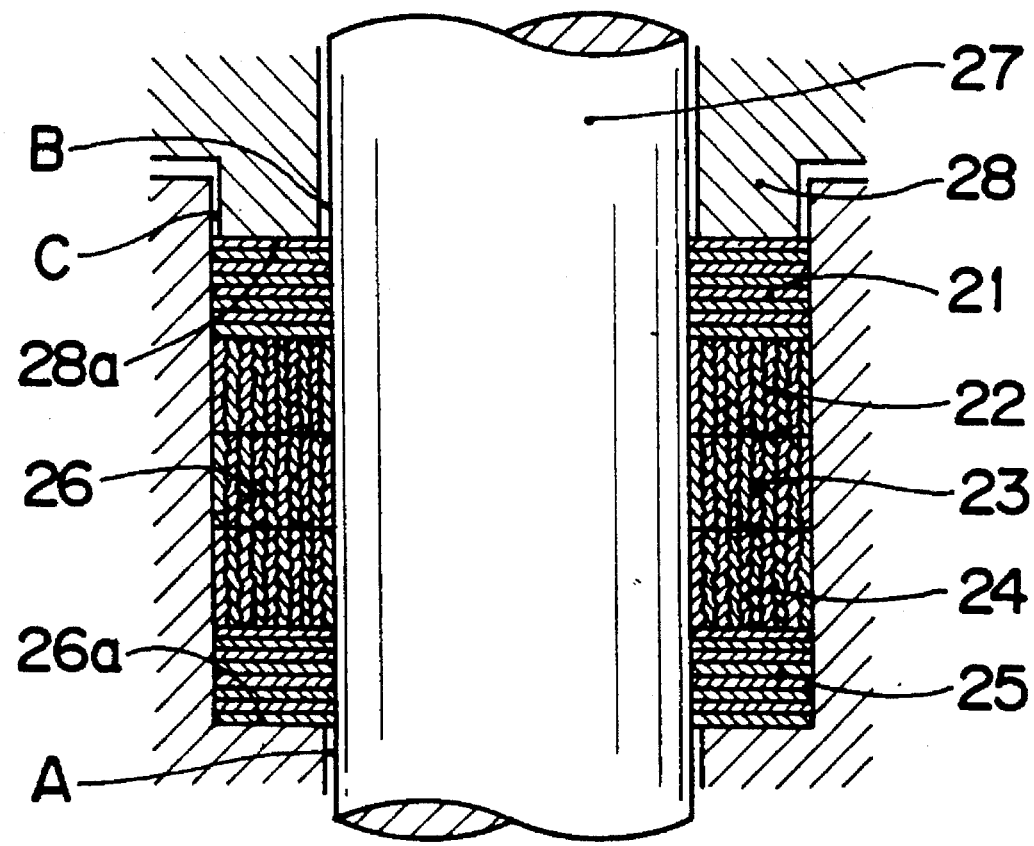
FIG. 18 is a partial cross section illustrating one example of the prior art seal device.

To confirm the sealing effect of the seal devices of this invention, three samples, namely a seal device having packing rings disposed as illustrated in FIG. 15 or 16 (hereinafter referred to as "Product X"), a seal device having conventional packing rings disposed as illustrated in FIG. 18 (hereinafter referred to as "Product Y"), and a seal device simply combining five packing rings obtained by spirally winding a ribbon of expanded graphite into a roll and compression molding the roll as described, though without illustration, in the section titled "Description of the Prior Art" (hereinafter referred to as "Product Z"), were tested for appropriate tightening stress determined in terms of the tolerable leakage. The conditions under which the test was carried out and the procedure which was adopted for the test are specified as follows.

Nominal dimension of each of Products X, Y and Z:

24 mm×3 mm×6.5 mm.

Tightening stress:

100 kgf/cm$^2$ at the beginning and successively increased every 50 kgf/cm$^2$.

Fluid sealed:

He gas having a pressure of 52.7 kgf/cm$^2$.

Temperature:

Room temperature (23° C±1° C.).

Leakage measuring apparatus:

A He gas leakage detector.

Concentration of tolerable leakage of He gas:

80 ppm (not more than 0.001 cc/min in terms of the amount of He gas leaked).

Procedure:

After the tightening stress of a gland retainer was set at 100 kgf/cm$^2$, a valve was loaded with He gas and, ten minutes after the loading, the amount of He gas leaked was measured. This was repeated after the tightening stress was increased by 50 kgf/cm$^2$ per procedure.

Figure 17:
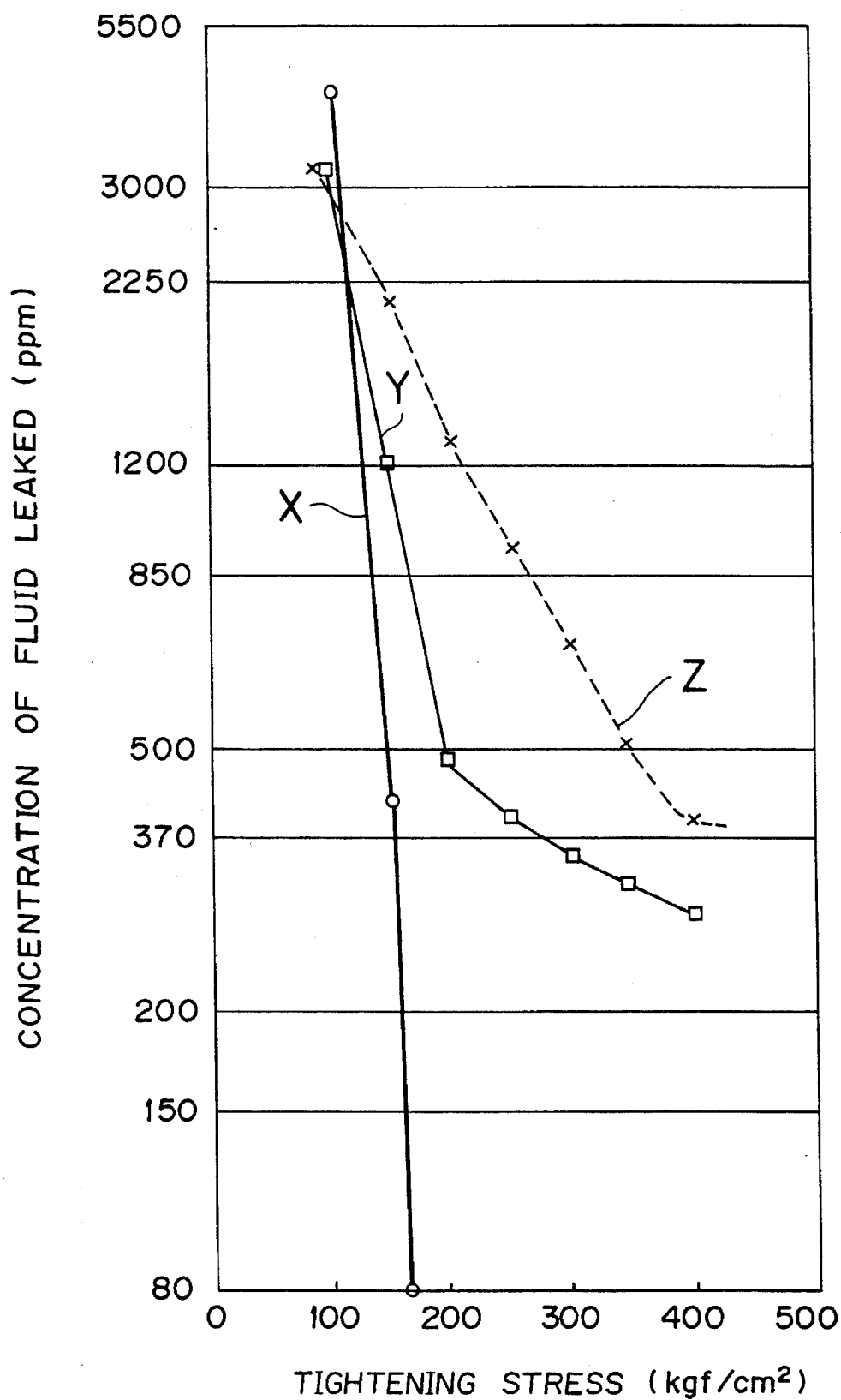
FIG. 17 is a characteristic diagram representing results of a test for comparison between the seal devices according to this invention and the prior art seal devices.

The results of this test were as shown in the characteristic curves of FIG. 17 plotting the results of the test for appropriate tightening stress. It is clearly noted from the characteristic diagram of FIG. 17 that the appropriate tightening stress of product X of this invention for the tolerable leakage is as small as 170 kgf/cm$^2$. In contrast, Product Y and Product Z failed to satisfy the tolerable leakage. The numerals indicated along the vertical axis of FIG. 17 represent leakage concentrations (in ppm) reduced from the amounts of leakage by the aspiration method.

As described above, the packing ring of this invention and the seal device using such packing rings of the invention excel in proofness against heat and chemicals and in sealability, completely obstruct leakage of a gas of small molecular weight and a solvent of stkrong osmosis, preclude protrusion of packing through the gap between a stuffing box and a stem, the gap between a gland retainer and the stuffing box and the gap between the stem and the gland retainer, sustain an injury only with difficulty, and allow the work of maintenance to be carried out easily. They can be applied to a wide variety of valves and other similar devices and utilized for infallibly preventing a florid from leaking and inducing environmental pollution. Thus, this invention brings about such outstanding effects as described above.

What is claimed is:

1. A packing ring of a composite structure, comprising:
   a packing formed by spirally winding a ribbon of expanded graphite into a roll and compression molding the roll; and
   an annular mass of superposed sheets of expanded graphite incorporated into said packing by compression molding so at least one packed part has a higher density than said packing in at least one of an inner peripheral part and an outer peripheral part of said packing.

2. A packing ring according to claim 1, wherein said packing has a density in the range of 0.7 g/cc to 1.9 g/cc and said annular mass has a density in the range of 0.7 g/cc to 1.9 g/cc.

3. A packing ring according to claim 2, wherein said packing has a density in the range of 1.0 g/cc to 1.5 g/cc and said annular mass has a density lower than said density of said packing.

4. A packing ring according to claim 1, wherein said annular mass is incorporated into one of an upper surface and a lower surface of said packing and extends to said outer peripheral pact of said packing to give rise to said packed part in said inner peripheral part of said one surface of said packing.

5. A packing ring according to claim 1, wherein said annular mass is incorporated into one of an upper surface and a lower surface of said packing and extends to said inner peripheral part of said packing to give rise to said packed part in said outer peripheral part of said one surface of said packing.

6. A packing ring according to claim 1, wherein said annular mass is incorporated into one of an upper surface and a lower surface of said packing and extends immediately before said inner peripheral part and said outer peripheral part of said packing to give rise to said packed part in each of said inner peripheral part and said outer peripheral part of said one surface of said packing.

7. A packing ring according to claim 1, wherein said annular mass is incorporated into an intermediate part of said packing and extends to said outer peripheral part of said packing to give rise to said packed part in said inner peripheral part of said intermediate part of said packing.

8. A packing ring according to claim 1, wherein said annular mass is incorporated into an intermediate part of said packing and extends to said inner peripheral part of said packing to give rise to said packed part in said outer peripheral part of said intermediate part of said packing.

9. A packing ring according to claim 1, wherein said annular mass is incorporated into an intermediate part of said packing and extends immediately before said inner peripheral part and said outer peripheral part of said packing to give rise to said packed part in each of said inner peripheral part and said outer peripheral part of said intermediate part of said packing.

10. A packing ring according to claim 4, further comprising an additional annular mass of superposed sheets of expanded graphite incorporated into the other of said upper surface and said lower surface of said packing and extending to said outer peripheral part of said packing to give rise to another packed part in said inner peripheral part of said the other surface of said packing.

11. A packing ring according to claim 5, further comprising an additional annular mass of superposed sheets of expanded graphite incorporated into the other of said upper surface and said lower surface of said packing and extending to said inner peripheral part of said packing to give rise to another packed part in said outer peripheral part of said the other surface of said packing.

12. A packing ring according to claim 6, further comprising an additional annular mass of superposed sheets of expanded graphite incorporated into the other of said upper surface and said lower surface of said packing and extending immediately before said inner peripheral part and said outer peripheral part of said packing to give rise to another packed part in each of said inner peripheral part and said outer peripheral part of said the other surface of said packing.

13. A seal device having an empty space through which a shaft passes and containing at least one packing ring in said empty space in a compressed fashion to seal between an inner wall of said empty space and an outer peripheral surface of the shaft, said at least one packing ring comprising a packing formed by spirally winding a ribbon of expanded graphite into a roll and compression molding the roll, and an annular mass of superposed sheets of expanded graphite incorporated into said packing by compression molding so at least one packed part has a higher density than said packing in at least one of an inner peripheral part and an outer peripheral part of said packing.

14. A seal device according to claim 13, further comprising a pair of braided packing rings between which said at least one packing ring is sandwiched, each of said braided packing rings being formed by braiding a knitting yarn of expanded graphite and accommodated in said empty space.

15. A seal device according to claim 14, wherein said at least one packing ring comprises at least one first packing ring and at least one second packing ring superposed one on top of the other, said first packing ring comprising a packing obtained by spirally winding a ribbon of expanded graphite into a roll and compression molding the roll and two annular masses of superposed sheets of expanded graphite incorporated one each into an upper surface and a lower surface of said packing and each extending to an outer peripheral part of said packing to give rise to a packed part having a higher density than said packing in an inner peripheral part of each of said upper surface and said lower surface of said packing, said second packing ring comprising a packing obtained by spirally winding a ribbon of expanded graphite into a roll and compression molding the roll and two annular masses of superposed sheets of expanded graphite incorporated one each into an upper surface and a lower surface of said packing and each extending to an inner peripheral part of said packing to give rise to a packed part having a higher density than said packing in an outer peripheral part of each of said upper surface and said lower surface of said packing.

16. A seal device according to claim 14, wherein said at least one packing ring comprises at least two superposed packing rings each comprising a packing obtained by spirally winding a ribbon of expanded graphite into a roll and compression molding the roll and two annular masses of superposed sheets of expanded graphite incorporated one each into an upper surface and a lower surface of said packing and each extending immediately before an inner peripheral part and an outer peripheral part of said packing to give rise to a packed part having a higher density than said packing in each of said inner peripheral part and said outer peripheral part of each of said upper surface and said lower surface of said packing.

17. A seal device according to claim 13, wherein said shaft is a stem of a valve and said empty space is a stuffing box formed between said stem and a body or bonnet of said valve.

18. A seal device according to claim 13, wherein said empty space is formed in a seal portion of a valve.

19. A seal device according to claim 13, wherein said empty space is formed in a shaft seal portion of a pump.

* * * * *

UNITED STATES PATENT AND TRADEMARK OFFICE
CERTIFICATE OF CORRECTION

PATENT NO. : 5,522,603　　　　　　　Page 1 of 8
DATED : June 4, 1996
INVENTOR(S) : Kazumasa NAITOU et al.

It is certified that error appears in the above-indentified patent and that said Letters Patent is hereby corrected as shown below:

IN THE TITLE:

Delete "METHOD FOR PRODUCTION OF THE PACKING RINGS,".

IN THE ABSTRACT:

Line 3, delete "a method";

Line 4, delete "including the steps of";

Line 11, change "containing" to --contains--.

Column 1, line 1 (the title), delete ", METHOD FOR";

line 2 (the title), delete "PRODUCTION OF THE PACKING RINGS,";

line 9, delete ",a method for the";

line 10, delete "production of the packing rings,";

line 19, after "part" insert --,--;

UNITED STATES PATENT AND TRADEMARK OFFICE
CERTIFICATE OF CORRECTION

| | | |
|---|---|---|
| PATENT NO. : | 5,522,603 | Page 2 of 8 |
| DATED : | June 4, 1996 | |
| INVENTOR(S) : | Kazumasa NAITOU et al. | |

It is certified that error appears in the above-indentified patent and that said Letters Patent is hereby corrected as shown below:

Column 1, line 22, delete "the" and delete "been";

line 23, change "posing" to --posed--;

line 27, change "property" to --properties--;

line 28, change "The" to --Known--; delete "are"; and, change "known in" to --are of--;

line 43, delete "the accuracy of machining of the";

line 44, delete "surface or the" and after "accuracy" insert --or when surfaces thereof are machined inaccurately--;

line 47, change "occurring" to --occur--;

line 51, delete "the";

line 57, delete "since";

line 59, change "is" to --are--;

line 60, change "face" to --faces-- and change "The" to --Thus, the--;

line 65, change "Then, in" to --In--;

UNITED STATES PATENT AND TRADEMARK OFFICE
CERTIFICATE OF CORRECTION

PATENT NO. : 5,522,603
DATED : June 4, 1996
INVENTOR(S) : Kazumasa NAITOU et al.

It is certified that error appears in the above-indentified patent and that said Letters Patent is hereby corrected as shown below:

Column 1, line 66, change "these" to --such--.

Column 2, line 4, delete "the accuracy of";

line 5, delete "machining of the surface or the" and after "accuracy" insert --or when surfaces thereof are machined inaccurately--;

line 7, delete "the";

line 24, change "calling for much" to --requiring substantial-- and delete "the sake";

line 25, delete "of";

line 33, change "stand for" to --refer to--;

line 35, change "stand for" to --represent--;

line 36, change "for" to --represent--;

line 38, change "stands for" to --refers to-- and delete "for" (second occurrence);

UNITED STATES PATENT AND TRADEMARK OFFICE
CERTIFICATE OF CORRECTION

PATENT NO. : 5,522,603     Page 4 of 8
DATED : June 4, 1996
INVENTOR(S) : Kazumasa NAITOU et al.

It is certified that error appears in the above-indentified patent and that said Letters Patent is hereby corrected as shown below:

Column 2, line 39, delete "for"

line 43, change "direct! ion" to --direction--;

line 59, delete "are suffered to";

line 62, change "8" to --18--;

line 65, delete "work of".

Column 3, line 1, change "the" (second occurrence) to --such--;

line 2, delete "to be";

line 7, change "excelling heal;" to --that have excellent heat--;

line 8, after "and" insert --that-- and change "eliminating" to --eliminate--;

line 26, rewrite as --packing. The packing ring--;

UNITED STATES PATENT AND TRADEMARK OFFICE
CERTIFICATE OF CORRECTION

PATENT NO. : 5,522,603
DATED : June 4, 1996
INVENTOR(S) : Kazumasa NAITOU et al.

It is certified that error appears in the above-indentified patent and that said Letters Patent is hereby corrected as shown below:

Column 3, line 27, change "comprising the steps of" to --is produced by--;

line 34, change "packing," to --packing.--;

line 35, change "and a" to --A-- and change "having" to --has--;

line 36, change "containing" to --contains--;

line 39, change "shaft, the" to --shaft. The-- and change "comprising" to --includes--;

line 43, delete "as";

line 44, change "to give rise to" to --that-- and change "having" to --has--.

Column 4, line 33, delete "invariably".

UNITED STATES PATENT AND TRADEMARK OFFICE
CERTIFICATE OF CORRECTION

PATENT NO. : 5,522,603
DATED : June 4, 1996
INVENTOR(S) : Kazumasa NAITOU et al.

It is certified that error appears in the above-indentified patent and that said Letters Patent is hereby corrected as shown below:

Column 5, line 60, change "more" to --further--.

Column 6, line 40, change "the" (second occurrence) to --each--;

line 41, change "rings" to --ring--;

line 49, delete "a";

line 50, change "ring" to --rings--; change "encounter" to --encounters--; and, delete "trouble";

line 51, delete "pertaining to" and after "maintenance" insert --difficulties--;

line 56, change "in the" to --with the main-- and delete "grand part";

line 57, delete "part";

line 58, change "stands for" to --refers to-- and delete "for" (second occurrence);

UNITED STATES PATENT AND TRADEMARK OFFICE
CERTIFICATE OF CORRECTION

PATENT NO. : 5,522,603
DATED : June 4, 1996
INVENTOR(S) : Kazumasa NAITOU et al.

It is certified that error appears in the above-indentified patent and that said Letters Patent is hereby corrected as shown below:

Column 6, line 59, delete "for";

line 60, change "the working example" to --such seal device--.

Column 7, line 5, change "this gap L and at" to --gap L. At--;

line 13, delete "in the present example" and delete "in" (second occurrence);

line 19, delete "such";

line 47, delete "the";

line 48, change "tolerance" to --tolerances--;

line 53, change "the" (second occurrence) to --such--;

line 62, delete "the" (first occurrence) and change "end parts" to --ends--;

line 63, after "2" insert --,--.

UNITED STATES PATENT AND TRADEMARK OFFICE
CERTIFICATE OF CORRECTION

PATENT NO. : 5,522,603  Page 8 of 8
DATED : June 4, 1996
INVENTOR(S) : Kazumasa NAITOU et al.

It is certified that error appears in the above-indentified patent and that said Letters Patent is hereby corrected as shown below:

Column 8, line 9, delete "the";

line 30, change "the" (first occurrence) to --such--;

line 47, change "stkrong" to --strong--;

line 51, delete "an" and delete "the work of".

Signed and Sealed this

Fourth Day of March, 1997

Attest:

BRUCE LEHMAN

*Attesting Officer*  *Commissioner of Patents and Trademarks*